July 31, 1956 W. C. POTTER 2,757,334
PORTABLE DIELECTRIC TESTER
Filed March 24, 1952
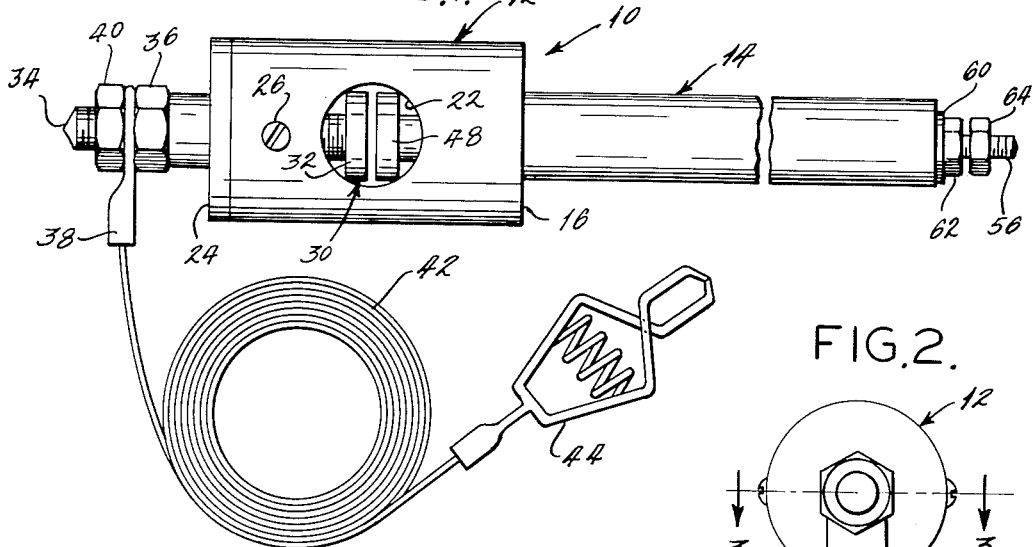
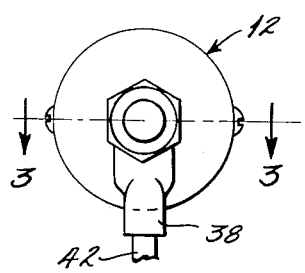
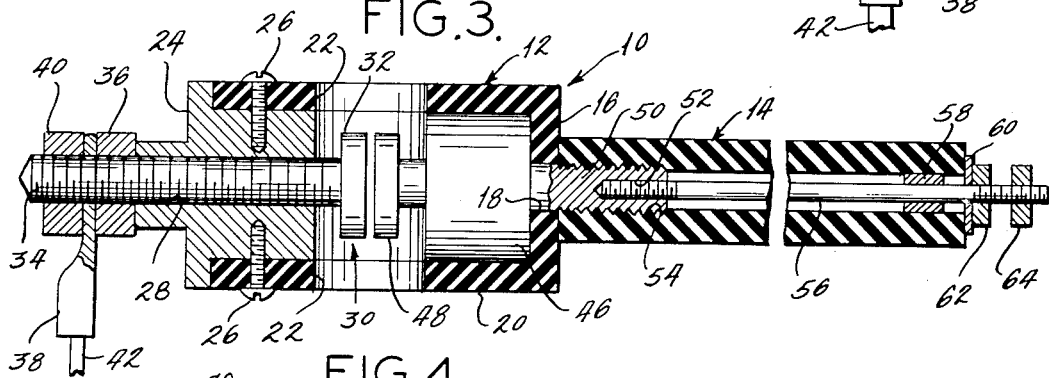
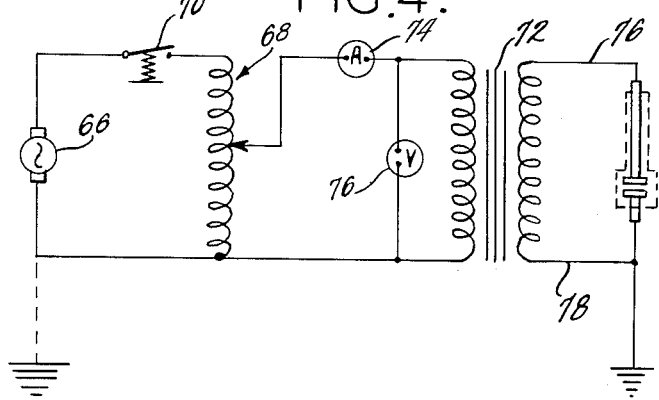
INVENTOR:
WILFRED C. POTTER.
By Gravely, Lieder,
Woodruff & Dees
ATTORNEYS.

United States Patent Office 2,757,334
Patented July 31, 1956

2,757,334

PORTABLE DIELECTRIC TESTER

Wilfred C. Potter, Overland, Mo., assignor to Wagner Electric Corporation, St. Louis, Mo., a corporation of Delaware Application March 24, 1952, Serial No. 278,279

5 Claims. (Cl. 324—30)

The present invention relates generally to the testing instrument art and more particularly to a novel portable dielectric tester for determining the dielectric strength of fluids such as insulating oil and the like.

In the known types of dielectric testers, a small amount of fluid is withdrawn as a sample from the main body of liquid being tested and placed in a container which forms a part of the testing device. In withdrawing and transferring the sample from the main body of liquid to the testing device, it is quite easy for it to pick up moisture from the air, as well as air itself, and to become contaminated by other foreign matter.

Furthermore, because of the construction of most transformers and other oil-containing electrical equipment, it is extremely difficult and quite often impossible to obtain a sample from more than one part of the container. In short, there is usually only one drain plug in the housing so that only the liquid immediately adjacent the plug can conveniently be withdrawn to be tested.

Another disadvantage of the known dielectric testers is that they are large and cumbersome and it is usually necessary to bring the liquid being tested to them instead of taking the tester into the field where the electrical equipment to be tested is located.

It is an object of the present invention therefore, to provide a novel portable dielectric tester which can be inserted directly into the body of liquid being tested, thereby minimizing the possibility of the liquid becoming contaminated. More particularly, it is an object to provide such a tester whch can be conveniently inserted into a transformer housing or the like, or a container for oil, and be moved about in the body of the liquid so as to test the dielectric strength at various points without having to remove numerous samples of the liquid from its container.

Another object is to provide a dielectric tester which is simple in construction, light in weight, and which can be easily transported to the site of the body of liquid being tested. More particularly, it is an object to provide such a tester which can be easily and quickly disassembled to a size which will conveniently fit into a container the size of an ordinary briefcase.

Another object is to provide a portable dielectric tester which includes means for easily and quickly adjusting the gap opening between the ends of the electrodes to provide for the testing of liquids of various dielectric strengths.

Further objects and advantages of the present invention will be readily apparent from the following detailed description, reference being had to the accompanying drawing wherein a preferred embodiment of the present invention is shown.

In one form, the device broadly comprises a support having two electrodes mounted thereon in spaced relationship, the support being sufficiently open to permit liquid or the like to surround the electrode when the housing is immersed therein. A handle member is removably fastened to one end of the housing so that the latter can be manually inserted into a body of liquid to be tested, and means are provided for selectively varying the distance between the inner end of the electrodes.

In the drawings:

Fig. 1 is a side elevational view of a portable dielectric tester constructed in accordance with the teachings of the present invention, Fig. 2 is an end view of the tester taken from the left side of Fig. 1, Fig. 3 is an enlarged horizontal transverse sectional view taken on the line 3—3 in Fig. 2, and Fig. 4 is a schematic wiring diagram of the electrical circuit.

Referring to the drawings more particularly by reference numerals, 10 indicates generally a portable dielectric tester embodying the teachings of the present invention, and which includes an electrode housing 12 and a handle 14 removably fastened thereto.

The electrode housing 12 is made of insulation material and is cup-like in shape with a hollow interior and an open end. It includes an end wall 16 which has an opening 18 at the center, and a side wall 20 which contains diametrically opposed openings 22 for admitting liquid to the interior of the housing for a purpose to appear.

A plug-like closure member 24, preferably of electrically conducting material, is disposed in the open end of the electrode housing 12 and is maintained in position by machine screws 26 which extend through the side wall 20. The closure member 24 contains an internally threaded axial bore 28 and threadedly positioned therein is a ground electrode 30.

The ground electrode 30 is made of electrically conducting material and includes an inner arcing tip portion 32, and a threaded body portion 34, the latter extending outside of the housing 12 and the closure member 24.

A locking nut 36 is threadedly mounted on the body portion 34 of the ground electrode against the outer end of the closure member 24 so as to maintain the electrode 30 in adjusted position relative to the electrode housing 12.

A conductor terminal 38 is held on the body portion 34 against the locking nut 36 by a retaining nut 40, the conductor terminal 38 receiving one end of a conductor 42 which has a ground clamp 44 fastened to its other end.

Disposed within the electrode housing 12 against the end wall 16 is a plug-like high voltage electrode 46 of electrical conducting material, which has an inwardly extending arcing tip portion 48 disposed in spaced relationship with the arcing tip portion 32 of the ground electrode 30.

At the opposite or outer end of the electrode member 46 is an externally threaded shaft-like portion 50 which protrudes through the opening 18 in the end wall 16, and which contains an internally threaded axial bore 52.

The handle 14, previously referred to, is of insulating material and is tubular in shape with internal threads 54 adjacent its inner end whereby it is threadedly and removably fastened to the shaft-like portion 50 of the high voltage electrode 46. Although the handle 14 is shown as being of unitary construction, it can be made in sections whereby it can be readily disassembled into short lengths so that the entire tester can be conveniently carried in a conventional briefcase.

A rod 56 of electrically conducting material extends through the tubular handle member 14 and is maintained in spaced relationship with the wall thereof by insulating bushings 58. Both ends of the rod 56 contain external threads, the inner end of the rod 56 being threadedly disposed in the bore 52 in the high voltage electrode 46, and the outer end thereof extending beyond the outer end of the tubular handle 14.

A washer 60 is disposed on the outer end of the rod 56 against the end of the handle 14, and is maintained in position by a lock nut 62.

A retaining nut 64 is disposed on the rod 56 adjacent the lock nut 62 whereby the conductor from the high voltage side of a power source can be connected to the rod 56, as will be more fully described.

It will be noted that the gap between the electrode tip portions 32 and 48 can be easily and quickly adjusted by merely loosening the lock nut 36, and rotating the ground electrode 30 relative to the electrode housing 12.

Also, the ground conductor 48 can be easily and quickly disconnected from the ground electrode 30 by removing the retaining nut 40, and the handle 14 can also be removed from the housing 12 by merely unscrewing it therefrom.

As shown schematically in Fig. 4, the electrical circuit for the dielectric tester includes a source of alternating potential 66 which is connected to the high side of an auto-transformer 68 through a switch 70 which is spring biased toward the open position.

The low side of the auto-transformer 68 is connected to the primary coil of an insulating transformer 72 and an ammeter 74 and a voltmeter 76 are included in the circuit at this point to measure the current flowing to the primary coil and the voltage impressed across it.

One side of the secondary of the insulating transformer 72 is connected to the end of the rod 56 through a conductor 76 and the other side thereof is connected to the ground electrode 30 through a conductor 78. The clamp 44 is connected to ground and it is preferable that the low side of the power source 66 be also connected to ground.

In operation, the dielectric tester 10 is grasped by the handle 14, and the electrode housing 12 inserted through any convenient opening in the apparatus container and into the body of liquid to be tested. Inasmuch as water and other foreign matter in the insulating liquid being tested are normally adjacent the bottom of the container, it is preferable to position the electrode housing 12 in the liquid at the lowermost part thereof.

The liquid will then flow through the openings 22 in the side wall of the housing 12, and surround the electrode tip portions 32 and 48.

The switch 70 is then held closed and the control of the auto-transformer 68 actuated to gradually increase the voltage applied across the gap between the electrode tip portions 32 and 48.

If no breakdown occurs across the electrode gap when the voltage across the primary coil of the insulating transformer 72, as indicated by the voltmeter 76, is increased to a predetermined value, the liquid possesses the necessary dielectric strength. However, if the breakdown of the liquid occurs before the predetermined minimum value is reached, as indicated by the sudden rush of current through the ammeter 74, the dielectric strength of the liquid is indicated by the value of voltage which causes this breakdown. This breakdown value can be observed on the voltmeter 27, which can be of the recording type, if desired.

Thus, it is apparent that there has been provided a novel portable dielectric tester which fulfills all of the objects and advantages sought therefor. The tester is of a size to be easily carried into the field, and, when necessary, can be easily and quickly disassembled by unscrewing the handle 14 from the housing 12 and the entire device fitted into an ordinary briefcase. Furthermore, the electrode housing 12 can be probed into all parts of the liquid body being tested so as to determine the dielectric strength at various points, without having to withdraw any liquid as a test sample. Because of the convenient size of the device, which is made possible in part by its novel construction, the electrode housing can be easily inserted into a transformer housing, or through the filling hole in an oil drum or barrel before the liquid is used, or, if desirable, it can be inserted into a cup into which liquid has been withdrawn.

In addition, the gap between the ends of the electrodes can be changed within predetermined limits by merely unloosening the locking nut 36 and rotating the ground electrode 30 within the closure member 24.

It is to be understood that the foregoing description and accompanying drawing have been given only by way of illustration and example, and that changes and alterations in the present disclosure, which will be readily apparent to one skilled in the art, are contemplated as within the scope of the present invention, which is limited only by the claims which follow.

What is claimed is:

1. A dielectric tester, comprising a tubular housing open at one end and having an end wall and a side wall; an opening in the side wall to admit liquid into the housing; a closure member removably mounted in the open end of the housing; a first electrode mounted within the housing adjacent the end wall, and having a portion thereof extending through the end wall to outside the housing; a second electrode threadedly mounted in the closure member for adjustment relative to the first electrode and having a portion thereof extending outside of the housing; means mounted on the second electrode for cooperation with the closure member for maintaining the second electrode in selected adjusted position; a tubular handle member removably connected to the portion of the first electrode which extends outside of the housing; and an electrical conductor carried within the handle member and connected to the first electrode.

2. A dielectric tester comprising a tubular housing open at one end and having an end wall and a side wall; an opening in the side wall to admit liquid into the housing; a closure member at the open end of the housing; a first electrode mounted in the closure member and extending both inside and outside the housing; a second electrode within the housing in spaced relationship with the first electrode and having a portion thereof extending through the end wall to outside the housing; and a rigid tubular handle member containing an electrical conductor therein removably fastened to the portion of the second electrode extending outside the housing.

3. A dielectric tester comprising a tubular housing open at one end and having an end wall and a side wall; an opening in the side wall to admit liquid into the housing; a closure member at the open end of the housing; a first electrode mounted in the closure member and extending both inside and outside the housing; means for adjusting the position of the first electrode relative to the closure member and the housing; a second electrode fixedly mounted within the housing in spaced relationship with the first electrode and having a portion thereof extending through the end wall to outside the housing; and a rigid tubular handle member containing an electrical conductor therein removably fastened to the portion of the second electrode extending outside the housing.

4. A dielectric tester comprising a tubular housing open at one end and having an end wall and a side wall; an opening in the side wall to admit liquid into the housing; a closure member at the open end of the housing; a first electrode mounted in the closure member and extending both inside and outside the housing; a second electrode within the housing in spaced relationship with the first electrode and having a portion thereof extending through the end wall to outside the housing; and a rigid tubular handle member having an inner end and containing an electrical conductor mounted therein, one end of the conductor being fixed in position relative to the inner end of the handle member, and both the handle member and the conductor being removably connected to the portion of the second electrode extending outside the housing.

5. A dielectric tester comprising a tubular housing open at one end and having an end wall and a side wall; an opening in the side wall to admit liquid into the housing; a closure member at the open end of the housing; a first electrode mounted in the closure member and extending both inside and outside the housing; a second electrode within the housing in spaced relationship with the first electrode and having a portion thereof extending through the end wall to outside the housing; and a rigid tubular handle member having a rigid electrical conductor fixedly mounted therein, one end of the handle member and the end of the electrical conductor adjacent thereto being removably fastened to the portion of the second electrode extending outside the housing.

References Cited in the file of this patent

UNITED STATES PATENTS

| | | |
|---|---|---|
| 1,518,211 | Maue | Dec. 9, 1924 |
| 1,670,640 | Smith | May 22, 1928 |
| 1,734,342 | Perry | Nov. 5, 1929 |
| 1,913,436 | Eckstein | June 13, 1933 |
| 2,330,394 | Stuart | Sept. 28, 1943 |
| 2,370,609 | Wilson et al. | Feb. 27, 1945 |
| 2,540,425 | Byrum | Feb. 6, 1951 |